US008583070B2

(12) United States Patent
Khazei

(10) Patent No.: US 8,583,070 B2
(45) Date of Patent: Nov. 12, 2013

(54) AUTONOMOUS ELECTROMAGNETIC EMISSIONS REDUCTION FOR SENSITIVITY IMPROVEMENT

(75) Inventor: Mehyar Khazei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 12/764,040

(22) Filed: Apr. 20, 2010

(65) Prior Publication Data

US 2011/0256899 A1    Oct. 20, 2011

(51) Int. Cl.
*H04B 1/10* (2006.01)
(52) U.S. Cl.
USPC ........................................................ 455/310
(58) Field of Classification Search
USPC ............. 455/63.1, 114.2, 296, 298, 310, 311, 455/312, 230
See application file for complete search history.

(56) References Cited

U.S. PATENT DOCUMENTS

| 6,438,698 | B1 | 8/2002 | Hellum |
| 6,834,380 | B2 | 12/2004 | Khazei |
| 7,206,731 | B2 | 4/2007 | Sercu et al. |
| 7,689,172 | B2 | 3/2010 | Jakonen et al. |
| 7,729,664 | B2 * | 6/2010 | Sorensen et al. ........... 455/67.13 |
| 2004/0114669 | A1 | 6/2004 | Takeuchi |
| 2008/0119140 | A1 * | 5/2008 | Maligeorgos et al. ..... 455/67.13 |
| 2008/0311875 | A1 * | 12/2008 | Jakonen et al. ............... 455/295 |
| 2009/0197591 | A1 | 8/2009 | Rolf et al. |
| 2010/0311374 | A1 * | 12/2010 | Sreerama et al. ........... 455/226.3 |
| 2011/0281524 | A1 * | 11/2011 | Gebara et al. ................ 455/63.1 |

FOREIGN PATENT DOCUMENTS

| WO | WO9629790 A1 | 9/1996 |
| WO | 03067379 | 8/2003 |
| WO | 2007127369 | 11/2007 |
| WO | WO2009132133 | 10/2009 |

OTHER PUBLICATIONS

International Search Report and Written Opinion—PCT/US2011/033302—ISA/EPO—Oct. 26, 2011.

* cited by examiner

*Primary Examiner* — Nguyen Vo
(74) *Attorney, Agent, or Firm* — Kenyon S. Jenckes

(57) ABSTRACT

Techniques are described to improve the electrical characterization of ICs and PCBs in a manner that ultimately contributes to network optimization by improving sensitivity without increasing power consumption. Knowledge generated by, for example, emissions and susceptibility profiles, is used to dynamically optimize sensitivity for a device, such as a handset, to take into account its operating environment in a network. In an exemplary embodiment, the handset takes advantage of a priori computed and/or measured electromagnetic interference profiles (such as noise profiles) to reduce or minimize interference among components in the device. In one scenario, using the knowledge of which components are interference aggressors, and which are victims of the potential interference scenarios, device operational states are adaptively configured.

20 Claims, 7 Drawing Sheets

AUTONOMOUS ELECTROMAGNETIC EMISSIONS REDUCTION FOR SENSITIVITY IMPROVEMENT

BACKGROUND

1. Field

The present disclosure relates to electronics and more particularly to techniques for sensitivity improvement in a wireless communication device, system or network.

2. Background

A key target in the evolution of mobile communication is to achieve ever higher end-user data rates. While higher peak data rates are desirable, equally desirable are higher data rates over an entire cell area, including, for example, users at a cell edge.

Data rate and channel capacity go hand-in-hand. A channel's capacity is the maximum rate that information can be transferred over a given communication channel. Although relatively complicated in the general case, for the special case of communication over a channel, e.g. a radio link, only impaired by additive white Gaussian noise, the channel capacity C is given by the relatively simple expression $$C = BW \cdot \log_2\left(1 + \frac{S}{N}\right), \quad \text{Eq. (1)}$$

where BW is the bandwidth available for the communication, S denotes the received signal power, and N denotes the power of the white noise impairing the received signal.

Two fundamental factors limiting the achievable data rate are the available received signal power, or more generally the available signal-power-to-noise-power ratio S/N, and the available bandwidth. To further clarify how and when these factors limit the achievable data rate, assume communication with a certain information rate R. The received signal power can then be expressed as $S=E_b \cdot R$ where $E_b$ is the received energy per information bit. Furthermore, the noise power can be expressed as $N=N_0 \cdot BW$ where $N_0$ is the constant noise power spectral density measured in W/Hz.

Clearly, the information rate can never exceed the channel capacity. Together with the above expressions for the received signal power and noise power, this leads to the inequality:

$$R \leq C = BW \cdot \log_2\left(1 + \frac{S}{N}\right) = BW \cdot \log_2\left(1 + \frac{E_b \cdot R}{N_0 \cdot BW}\right) \quad \text{Equation (2)}$$

or, by defining the radio-link bandwidth utilization $\gamma$ R/BW, $$\gamma \leq \log_2\left(1 + \gamma \cdot \frac{E_b}{N_0}\right). \quad \text{Eq. (3)}$$

This inequality can be reformulated to provide a lower bound on the required received energy per information bit, normalized to the noise power density, for a given bandwidth utilization $\gamma$ $$\frac{E_b}{N_0} \geq \min\left\{\frac{E_b}{N_0}\right\} = \frac{2^\gamma - 1}{\gamma} \quad \text{Eq. (4)}$$

For bandwidth utilizations significantly less than one (that is for information rates substantially smaller than the utilized bandwidth) the minimum required $E_b/N_0$ is relatively constant, regardless of $\gamma$. For a given noise power density, any increase of the information data rate then implies a similar relative increase in the minimum required signal power $S=E_b \cdot R$ at the receiver. On the other hand, for bandwidth utilizations larger than one the minimum required $E_b/N_0$ increases rapidly with $\gamma$. Thus, in case of data rates in the same order as or larger than the communication bandwidth, any further increase of the information data rate, without a corresponding increase in the available bandwidth, implies a larger, eventually much larger, relative increase in the minimum required received signal power.

Basic conclusions can thus be drawn regarding the provisioning of higher data rates in a mobile-communication system when noise is the main source of radio-link impairment (a noise-limited scenario).

First, the data rates that can be provided in such scenarios are always limited by the available received signal power or, in the general case, the received signal-power-to-noise-power ratio. Furthermore, any increase of the achievable data rate within a given bandwidth will require at least the same relative increase of the received signal power. At the same time, if sufficient received signal power can be made available, basically any data rate can, at least in theory, be provided within a given limited bandwidth.

In case of low-bandwidth utilization, i.e., as long as the radio-link data rate is substantially lower than the available bandwidth, any further increase of the data rate requires approximately the same relative increase in the received signal power. This can be referred to as power-limited operation (in contrast to bandwidth-limited operation) where an increase in the available bandwidth does not substantially impact what received signal power is required for a certain data rate.

On the other hand, in case of high-bandwidth utilization, i.e. in case of data rates in the same order as or exceeding the available bandwidth, any further increase in the data rate requires a much larger relative increase in the received signal power unless the bandwidth is increased in proportion to the increase in data rate. This can be referred to as a bandwidth-limited operation since an increase in the bandwidth will reduce the received signal power required for a certain data rate. Thus, to make efficient use of the available received signal power or, in the general case, the available signal-to-noise ratio, the transmission bandwidth should at least be of the same order as the data rates to be provided.

Assuming a constant transmit power, the received signal power can always be increased by reducing the distance between the transmitter and the receiver, thereby reducing the attenuation of the signal as it propagates from the transmitter to the receiver.

Thus, in a noise-limited scenario it is at least in theory always possible to increase the achievable data rates, assuming that one is prepared to accept a reduction in the transmitter/receiver distance; that is a reduced range. In a mobile-communication system this would correspond to a reduced cell size and thus the need for more cell sites to cover the same overall area. Especially, providing data rates in the same order as or larger than the available bandwidth, i.e. with a high-bandwidth utilization, would require a significant cell-size reduction. Alternatively, one has to accept that the high data rates are only available for mobile terminals in the center of the cell, i.e. not over the entire cell area.

Another means to increase the overall received signal power for a given transmit power is the use of additional antennas at the receiver side, also known as receive-antenna diversity. Multiple receive antennas can be applied at the base station (that is for the uplink) or at the mobile terminal (that is for the downlink). By proper combining of the signals received at the different antennas, the signal-to-noise ratio after the antenna combining can be increased in proportion to the number of receive antennas, thereby allowing for higher data rates for a given transmitter/receiver distance.

Multiple antennas can also be applied at the transmitter side, typically at the base station, and be used to focus a given total transmit power in the direction of the receiver, i.e. toward the target mobile terminal. This will increase the received signal power and thus, once again, allow for higher data rates for a given transmitter/receiver distance.

However, providing higher data rates by the use of multiple transmit or receive antennas is only efficient up to a certain level, i.e. as long as the data rates are power limited rather than bandwidth limited. Beyond this point, the achievable data rates start to saturate and any further increase in the number of transmit or receive antennas, although leading to a correspondingly improved signal-to-noise ratio at the receiver, will only provide a marginal increase in the achievable data rates. This saturation in achievable data rates can be avoided though, by the use of multiple antennas at both the transmitter and the receiver, enabling what can be referred to as spatial multiplexing, often also referred to as MIMO (Multiple-Input Multiple-Output). However, MIMO techniques may increase the size and cost of a wireless device.

An alternative to increasing the received signal power (say by accepting a smaller cell size, or employing MIMO techniques), perhaps at significant cost, is to reduce the noise power, or more exactly the noise power density, at the receiver. This can, at least to some extent, be achieved by more advanced receiver RF design, allowing for a reduced receiver noise figure.

Reducing receiver noise figure is a great challenge. As portable electronic devices become increasingly miniaturized and multi-functional, internally generated noise becomes more of a problem both at the component level as well as within a handset (i.e. system level). Noise has the potential to adversely affect circuit components through electromagnetic interference (EMI). Prior attempts to address EMI problems have traditionally focused on debugging a prototype, modifying the floor plan and system layout, and improving shielding—all of which come at significant cost, in terms of price and time to market, for both the component and handset manufacturer.

In modern ASIC design, IC designers must enter the EMI mitigation process at an early stage because switching noise analysis and electrical characterization are important to optimizing the die and package floorplan, as well as layout and substrate design. Electromagnetic compatibility (EMC) and electromagnetic interference (EMI) issues are traditionally addressed, ad hoc, at the chip design level using modern IC design automation (EDA) tools. Because EDA is a semiconductor product design process, it does not adequately address EMC and EMI issues at the board (system) level.

Currently, ASIC designers use their skills and familiarity with EMI generally, to control and minimize electromagnetic coupling (such as crosstalk) at the device and system level by using the commercially available field solvers and built-in constraint managers provided by EDA tools. This process is time consuming and often lacks accuracy when applied to the design and development of complex 3-D ASICs operating at high (greater than about 600 MHz) clock frequencies.

Taking the wireless product as an example, a better solution is to establish a systematic design methodology. Such a methodology must consider noise and interference-related issues at component, PCB, mobile and network level—offering solutions at each stage for their control mitigation both internally and globally.

Even this is often not sufficient because in an actual implementation external interference can contribute to EMI. Such external interference often depends on floor planning, layout and shielding. Traditionally, external interference is addressed experimentally once the prototype becomes available. This is time consuming and costly.

The ultimate (for best performance in the field) floor plan and layout at device or system level cannot be known, a priori, by the semiconductor designer. There are however some general rules and guidelines that are commonly known and understood. For example, it is known that certain blocks of an integrated circuit (IC), such as a baseband processor in a mobile device, can cause interference to either themselves or to other ICs. It is also known that certain blocks of an IC are highly susceptible to interference. When combining a baseband processor with an RF component on a printed circuit board (PCB), the component's emission profiles and/or susceptibility profiles may be known and utilized by known methods to arrive at an electromagnetically compatible configuration for the proposed electronic system.

U.S. Pat. No. 6,834,380, entitled "Automated EMC-Driven Layout and Floor Planning of Electronic Devices and Systems", commonly assigned as the present application and incorporated herein by reference, describes automated electromagnetic compatibility-driven (EMC-driven) layout and floor planning of electronic devices and systems at the PCB level. The patent describes techniques to account for electromagnetic interactions between circuit components (such as ICs) and to address internal EMC issues at the outset of the design phase. This is done through identification of aggressors and victims and their association to emissions and susceptibility profiles, respectively.

Wireless network operators typically define sensitivity specifications for handsets to ensure optimum service quality. Any improvement in noise sensitivity at the design phase of such handsets makes it easier to meet these strict specifications. Multimode chipsets (e.g., EV-DO, HSPSA, LTE, etc.), and the handsets they go into, are a critical driver to improve noise sensitivity. By looking at the various emissions and susceptibility profiles of components a handset designer is able to deliver a better floor plan, layout and shielding of a PCB—characterized by reduced noise emissions and low EMI. Better EMI performance at the PCB level means less receiver self-jamming with better overall sensitivity.

Known techniques for floor planning and layout design methodology do not take into account the possible network impact when the device is actually operated by a user (for example, in idle, call, and/or data mode). As such, there may be a lack of sensitivity optimization at the handset in its true operating network environment. This is because certain emissions may only be present when the handset is in a particular mode and subject to unique noise metrics from current, voltage or clock switching, occurring in a given state.

SUMMARY

The exemplary embodiments mitigate the effects of internal EMI in electronic devices to improve receiver sensitivity.

The EMC-driven techniques described herein improve the performance of ICs and PCBs in a manner that ultimately contributes to network optimization by improving sensitivity, without increasing power consumption.

The present disclosure establishes: (a) a systematic methodology to optimize hardware and firmware for low noise operation using electromagnetic metrics; and (b) guidelines, algorithms and metrics for operational and dynamic optimization at the device, system and network level.

The present disclosure makes use of knowledge generated by electromagnetic profiles, such as for example emissions and susceptibility profiles. Such knowledge allows dynamic optimization of sensitivity for a device, such as a handset, accounting for its operating environment in a network.

In an exemplary embodiment, the handset takes advantage of a priori modeled, computed and/or measured electromagnetic profiles to reduce or minimize interference among components in the device. In one scenario, using the knowledge of which components are interference aggressors, and which are potential victims, a device's operational states are adaptively changed.

In a further scenario, a change of operational state is initiated under predetermined conditions, where such conditions may otherwise cause inter-component or intra-component interference problems or system sensitivity (S/N) degradation. One such example condition occurs when a base station signal is weak or absent.

In yet a further scenario, an adaptive change of operational state is performed by: (i) selectively turning off non-essential components; (ii) reducing drive currents to the components so they operate in low power mode; (iii) powering up blocks incrementally rather than abruptly; (iv) turning on aggressor blocks sequentially rather than simultaneously; (v) increasing or adjusting delay time before switching on the next block.

When a wireless device is seen by the network, its BER is reported in real time. BER, position and additional (S/N) metrics may be recorded by the wireless device and reported to the network in real time, or whenever a link is available. This information helps the service provider: (a) optimize a network dynamically for better range, call quality, power consumption (wireless device data card, handset, etc.) and channel capacity; (b) to have more accurate data about service quality in a given environment under different load conditions (to be used to improve service quality); (c) select suitable wireless devices for operation in the specific environment (e.g. urban versus rural areas).

Figure 1:
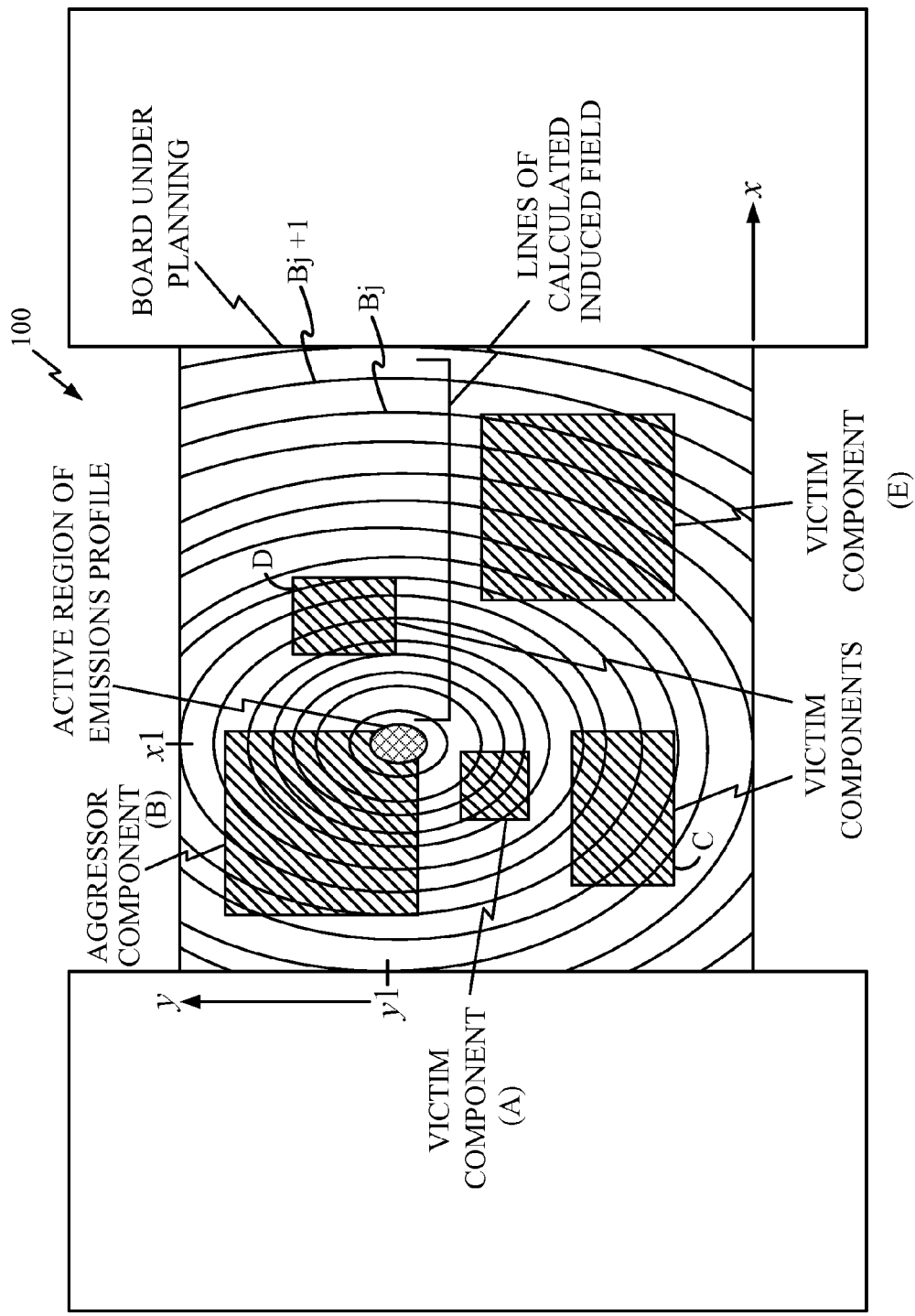
FIG. 1 is a simplified plan view of an example circuit.

To facilitate understanding, identical reference numerals have been used where possible to designate identical elements that are common to the figures, except that suffixes may be added, where appropriate, to differentiate such elements. The images in the drawings are simplified for illustrative purposes and are not necessarily depicted to scale.

The appended drawings illustrate exemplary configurations of the disclosure and, as such, should not be considered as limiting the scope of the disclosure that may admit to other equally effective configurations. Correspondingly, it has been contemplated that features of some configurations may be beneficially incorporated in other configurations without further recitation.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The sensitivity improvement techniques described herein may be used to improve communication over various wireless communication systems such as CDMA, TDMA, FDMA, OFDMA, TD-LTE, TD-SCDMA and SCFDMA systems. The terms "system" and "network" are often used interchangeably. A CDMA system may implement a radio technology such as cdma2000, Universal Terrestrial Radio Access (UTRA), etc. cdma2000 covers IS-2000, IS-95, and IS-856 standards. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA 2000 and UMB are described in documents from an organization named "3rd Generation Partnership Project 2" (3GPP2).

Similarly, the words handset, receiver, mobile, mobile device, mobile communication device, user equipment (UE), access terminal, portable device, and the like may used interchangeably to refer to any device capable of data communication over a wireless network.

The present disclosure relates to a technique by which a device, such as a mobile communication device, takes advantage of a priori and real-time measured, calculated and/or computed electromagnetic profiles (such as noise profiles, including emissions and susceptibility profiles) to reduce or minimize interference among components in the device. It is possible to establish a relational database for BER and handset receiver S/N, and to record and report this database to a base station.

Using the knowledge of which components are interference aggressors, and which are victims of the potential interference scenarios, component operational states are adaptively changed.

A change of a component's operational state is initiated under predetermined conditions that may otherwise cause inter-component or intra-component interference problems or system sensitivity (S/N) degradation. One such condition occurs when a base station signal is weak or absent. Dynamic change can be performed in a number of ways, such as by: (i) selectively turning off non-essential components; (ii) reducing drive currents to the components to operate in low power mode; (iii) powering up blocks incrementally rather than abruptly; (iv) turning on aggressor blocks sequentially rather than simultaneously; and/or (v) adjusting delay time before switching on the next block.

The electromagnetic profiles of the various components are computed and/or measured beforehand using computational techniques and near-field measurements. Aggressor blocks are identified, which are elements that have the ability to degrade or disrupt operation at the device or system level at critical in-band frequencies of the system. Usually the "system level" is defined as the wireless product level while "device level" refers to the component level (such as an IC). The IC may be a baseband processor, an RF processor, a hybrid ASIC or similar component.

The results are used to create figures of merit for each device, for the functional blocks of the device, and for passive components of the system. The information obtained at this early stage on potential interference sources and mechanisms, electromagnetic profiles such as emissions and susceptibility profiles, are used to develop guidelines for product sensitivity-centric operation. These guidelines, listed above as the adaptive change of operational state options, include recipes for reduction, control and management of device/ system switching noise and radiated emissions.

As an example, in a wireless device, email may be set up to be downloaded every half hour or so. However, when a GPS function is enabled, email does not work, or vice versa. The cause of the problem could be that noise radiated by the emissions profile of the logic circuit running the email program is causing the GPS logic to function improperly. One solution (for example) is to turn off the GPS block during the email delivery interval, and then turn it back on when email is deactivated or after some expired time interval. If the interference problem between GPS and email only occurs when the base station signal is weak, then the adjustment of the GPS/email blocks may be implemented only under this condition.

The solution is, in part, a design tool. That is, on the basis of the electromagnetic profiles and system architecture, operational designs are provided which complement designs for component block placement.

The design tool makes use of the knowledge generated on potential interference sources and mechanisms, electromagnetic profiles such as emissions and susceptibility profiles, to dynamically optimize sensitivity for a device, such as a handset, accounting for its operating environment in a network. This is done, in part, by optimizing device and handset designs (both hardware and firmware) in accordance with various power and sensitivity metrics as if the handset were operational; and providing switching to a best sensitivity mode of operation when in use in the network.

A major aim of the present disclosure is to guide the development of tools for electrical characterization of ICs and PCBs that will ultimately contribute to network optimization (such as better service quality, channel capacity) using the most suitable handsets for the designated environment.

Both network operators and handset manufacturers focus on sensitivity because it directly impacts handset call quality and power consumption. Conceptually, a handset that can consistently detect a lower level signal will have better voice clarity and fewer call disruptions due to (e.g.) service availability issues and dropped calls. In practice, better sensitivity improves handset coverage within a given cell—including along the boundaries of a cell—and provides more robust immunity to fading conditions, and in addition, reduces power consumption. With enhanced sensitivity, operators have the opportunity to improve channel capacity, service quality, and lower infrastructure equipment expenditures within a targeted footprint.

In a handset, the receiver's sensitivity determines how well the handset performs in weak signal conditions, with respect to a given bit-error rate target. If the handset can handle a higher-powered interference signal or noise while still maintaining the specified bit-error rate (BER) or frame error rate (FER), the result will be a reduced interference contribution to the network attributable to that handset, leading to an overall increase in the capacity available on the network. Also, a handset with good sensitivity can effectively increase the overall cell overlap capacity, reducing the number of dropped calls experienced by an end-user.

In a power control scheme employed by many of today's wireless networks, base station and handset power is continually adjusted to keep the BER (or FER) within a target range. If the BER at the handset is too high, base station power is increased to improve the signal strength incident upon the handset and thus improve the BER. However, if the BER is below the target range, communication quality is assumed to be excellent, whereby the base station can afford to reduce RF transmit power to the handset. A similar power control scheme is often implemented in the uplink direction, thereby reducing overall RF transmit power in the network for a given number of mobile devices, and reducing potential interference.

When receiver sensitivity is poor, the mobile will have difficulty decoding signals at lower levels, such as during use at the fringe of the cell. This could lead the mobile to request additional power when compared to better-performing units, increasing the interference level on the cell and on neighboring cells. Also, this could lead to base station increasing the gain of the handset's transmitter (e.g. power amplifier (PA)) hence increasing its power consumption.

A solution is described herein to mitigate the effects of internal EMI in electronic devices in general, and particularly in mobile communication devices, to thereby improve receiver sensitivity and realize the attendant benefits.

The drive toward higher functionality integration, higher clock frequencies, more data throughput, smaller process size and smaller electronic packaging requires a new and improved approach to electromagnetic compatibility management, both at the device and system level. For instance, determination of the reference sensitivity level helps to determine how well the phone or wireless product will perform in weak signal conditions (with respect to a given bit error rate (BER) target, without any source of interference). The lower the reference sensitivity level of the handset, the greater the network coverage it will experience.

As explained above, a handset's reference sensitivity level translates directly into network coverage and service quality experienced by the handset. A handset with a relatively poor sensitivity will have difficulty successfully detecting signals at lower levels. This could lead the handset to request additional power when compared to better-performing handsets, increasing the interference level on the cell and on neighboring cells. This ultimately reduces overall network capacity.

Hence, it is desirable to determine the true reference sensitivity level of a handset. Another reason is that better sensitivity can effectively increase the overall cell overlap capacity, reducing the number of dropped calls experienced by an end-user. Actual field tests make it clear that significant differences in reference sensitivity levels can exist on handsets deployed in a live network, even though all these handsets have passed conformance testing. If a given handset is capable of handling a higher-powered interference signal (i.e., have better immunity to noise) while still maintaining the specified or target BER level, the result will be a reduced interference contribution to the network attributable to that handset, leading to an overall increase in the capacity available on the network and service quality.

A number of solutions exist to reduce the interference contribution. One is to allocate additional power per connection in the downlink to overcome the interference, resulting in trade-off between performance and cell capacity. Another is to reduce the downlink transmission rate (voice or data) to provide additional processing gain to offset the level of interference experienced. A third way is to reduce noise at IC and board level. This latter approach helps to: (i) reduce dropped calls; (ii) improve service; (iii) reduce handset power consumption; and (iv) ultimately, reduce stress on the network.

In the case of a base station transmitter to handset link (i.e. "downlink" or "forward link"), the air interface is a shared resource between multiple carriers each with their own assigned portion of the spectrum. A base station transmitter must be designed in such a way as not only to generate a clean signal within the assigned spectrum portion, but also to keep inter-carrier interference within acceptable levels. The receiver, likewise, must reliably demodulate the wanted signal in order to avoid requiring excessive energy to be transmitted, while also rejecting interference from neighboring carriers.

The performance requirements of a next generation 4G (e.g., LTE) mobile communication system are intended not to be significantly more complex than those of a 3G (e.g., UMTS, EVDO) mobile communication system. Nevertheless, there are a number of key differences between LTE and UMTS which affect design complexity and performance in the field. LTE uses variable channel bandwidth, up to a maximum of 20 MHz. From a design standpoint, this is significantly more challenging. For example, a transceiver for a constant bandwidth radio spectrum can potentially employ fixed filters at a number of points in the signal processing. Such filters are designed to pass a signal with known characteristics and reject particular frequencies. However, if the bandwidth of the transceiver is variable over a wide range, fixed filters cannot be used. Frequencies which must be passed in 20 MHz operation may need to be rejected in the narrower bandwidth modes. This implies that LTE transceivers must be more adaptable than those of previous systems, while also being cleaner in transmission and having better selectivity (and S/N) in reception.

On the receiver side, since modern ASICs are mostly multi-mode, a higher level of optimization is required in design and operation. For this reason, improved sensitivity and power metrics for static and dynamic optimization of the network components is very desirable.

LTE is even more adaptable than UMTS in terms of the range of data rates it supports in order to suit different SINR (signal-to-interference plus noise ratio) conditions. This implies a large number of modes of operations and flexibility in signal handling capabilities. This translates, in turn, to LTE requiring more demanding receiver and transmitter designs. Furthermore, reception of the maximum data rate requires high SINR at the highest bandwidth and is particularly challenging for the A/D converter in an LTE receiver.

Also, the LTE signal structure itself alters which specific RF aspects are the most critical. OFDM is used in the downlink. OFDM requires better frequency synchronization and is more sensitive to phase noise. It should be appreciated that the ability to determine appropriate clock frequencies, timing, edge rates, drive levels, floor planning and layout at design level (chip and PCB), and creation of related metrics will benefit LTE.

In the context of quality of transmission, unwanted emissions are usually more challenging for an LTE designer. Ideally, the radio should transmit nothing at all outside its designated transmission channel. In practice however, this is not the case. A designer must, as a result, be concerned with spurious and out of band emissions.

Spurious emissions occur well outside the bandwidth necessary for transmission and may arise from a large variety of non-ideal effects, including harmonics, emissions, and intermodulation products. The magnitudes of the spurious emissions may or may not vary with transmitter power.

Out of band emissions may be an almost inevitable by-product of the modulation process itself, and are also often caused by nonlinearities in the power amplifier. For this reason, out of band specifications are typically defined with respect to the edge of the occupied bandwidth in an LTE network.

Because out of band emissions occur close to wanted signals, increasing the power level of the wanted transmission is another factor that will usually increase the level of the unwanted emissions.

Leakage into adjacent channels (due to intermodulation) also increases sharply as a transmitter's power amplifier is driven into its non-linear operating region at the highest output power levels, due in particular to intermodulation products.

In the case of an LTE transmitted signal, full rated output power can be used to counteract path loss at the cell edge. This helps ensure wide area coverage.

As for receiver RF specifications, LTE is in this regard very similar to UMTS. The main differences between LTE and UMTS receiver requirements arise from the variable channel bandwidth and the new multiple access schemes available in LTE.

Receiver noise figure is a measure of the degradation of the SINR caused by components in the RF signal path. This may be attributable to: (i) antenna filter losses; (ii) noise introduced by an analog portion of a receiver; (iii) degradation of the signal due to imperfections of the analog portion of a receiver; (iv) noise introduced by an A/D converter; and (v) any other noise sources of a receiver.

A handset's receiver section must combat a wide range of interfering signals in order to enable reliable demodulation of the wanted signal and to avoid undue influence from extraneous transmissions (and internally generated noise). The sources of interference are many and varied and include leakage from the handset's own transmitter section and emissions from on-board components, legitimate transmissions in adjacent or non-adjacent channels, narrowband blocking signals, and the products of nonlinear distortions arising within the handset itself.

The amount of transmission resources needed for control signaling depends on the error rate requirements, the size of the data packets, and the time considered acceptable to switch from ideal to active states. Data transmission can make use of whatever transmission resources are left over after resources have been allocated for the control signaling. Hence, minimizing control signaling is a key to maximizing data spectral efficiency.

The goal therefore to improving sensitivity is to minimize the size of resource allocations. In high signal to interference plus noise ratio (SINR) conditions, a max achievable capacity can be limited by the minimum amount of transmissions resources which can be allocated to a single user.

In development of wireless communication products, the present disclosure proposes automatic, functionality based, optimization methodologies incorporated preferably in software at either or both the IC (device) and PRB (system) level of handset design to reduce SINR degradation and improve sensitivity.

FIG. 1 is a simplified plan view of an example circuit 100. In accordance with an exemplary embodiment, circuit 100 may be a layout of a printed circuit board (PCB) or integrated circuit (IC). Whether a PCB or IC, circuit 100 is an integral part of a device, such as a mobile communications device (handset), optimized in accordance with embodiments of the invention to be described. Circuit 100 takes advantage of a priori computed and/or measured electromagnetic profiles, such as emissions and susceptibility profiles, to reduce or minimize interference among components in the device.

Using the knowledge of potential interference sources and mechanisms, of which components are interference aggressors, and which are potential victims, their emissions profiles and susceptibility profiles, component operational states are adaptively changed. Adaptive change of the component operational states is initiated under predetermined conditions (conditions that may otherwise cause inter-component or intra-component interference problems or system sensitivity (S/N) degradation). One such condition occurs when a base station signal is weak or absent. Adaptive change can be performed in a number of ways, such as by: (i) selectively turning off non-essential components; (ii) reducing drive currents to the components to operate in low power mode; (iii) powering up blocks incrementally rather than abruptly; (iv) turning on aggressor blocks sequentially rather than simultaneously; and/or (v) adjusting delay time before switching on the next block.

The electromagnetic profiles may also be used to optimize floor planning and layout to reduce intra-component and inter-component interference at the device or system design stage. The combination of optimizing floor planning and layout with adaptive adjustment among desired modes of operation is particularly efficient in achieving high sensitivity, without compromising power consumption.

To illustrate some of the concepts taught herein, circuit 100 is shown with five functional circuit components A through E, each occupying a distinct area in the horizontal x-y plane as shown. In a first scenario, circuit 100 is a PRB with each component A through E being a distinct IC, distinct active or passive components, or a combination of one or more components (collectively defining a block of components) disposed on the PCB. In an alternate scenario, circuit 100 is an IC. In like manner, functional circuit components A through E are functional blocks forming part of a common IC.

While shown arranged in a common plane, in other arrangements two or more of the components A-E may be arranged in a 3-D stacked configuration. In the stacked case, circuit components are spaced apart in the z direction (perpendicular to the x-y plane) and may overlie one another in x-y space. Any component A to E may be a passive component or an active device, an interconnect, or an entire electronic product itself.

In normal operation, each component A-E radiates a finite amount of in-band undesirable electromagnetic emissions that may adversely affect the operation of the other circuit components of circuit 100. A component that adversely affects or interrupts the planned operation of another component at one or more in-band frequencies is said to be the aggressor block. The block impacted adversely by the radiated electromagnetic emissions from the aggressor block is said to be the victim block. A block may act or behave as both an aggressor block and a victim block in relation to itself (self-jamming) or in relation to other blocks at one or more in-band frequencies.

In accordance with aspects of the invention disclosed herein, physical attributes of the electromagnetic emissions (e.g. intensity, direction at a specific frequency) are calculated and/or measured at selected locations on one or more planes above or below, and in proximity to, the circuit 100 surface or in three dimensions. Based on the measurements/calculations, an electromagnetic profile is determined for one or more individual components. As used herein, an electromagnetic profile refers to the electromagnetic 'near field' intensity generated by the component, as a function of frequency, either at the selected locations at which it is measured, or across the entire circuit 100 surface. In one scenario, electromagnetic profiles are determined at points in a grid spaced a short distance above the component, where the grid is about the same size as the component in the x-y plan (or larger). Based on vector measurements at the grid points, the near field intensity across the entire circuit 100 surface can be extrapolated by calculation and its induced effects computed. The process and related tools for calculating, measuring and computing electromagnetic profiles is described in detail in the '380 patent, which is incorporated herein by reference.

In the example of FIG. 1, component B emits noise forming an "eye" 102 (centered at coordinates x1, y1)—i.e., an area of noise power having maximum near field intensity. Emissions field lines such as Bj, Bj+1, represent electromagnetic emissions radiated by component B across the circuit 100. These field lines can typically be computed or measured emissions profiles of the identified source, generated from knowledge of the eye 102 coordinates, its size, orientation, the intensity of the noise within the eye, and its characteristics such as the allocation of the energy between electric and magnetic field energy. Thus, the emissions profile of the component B may actually be narrowed down to the eye 102 itself, provided that the eye (hot spot/source) contains sufficient emissions information to accurately predict the noise energy throughout the entire circuit 100.

Figure 2:
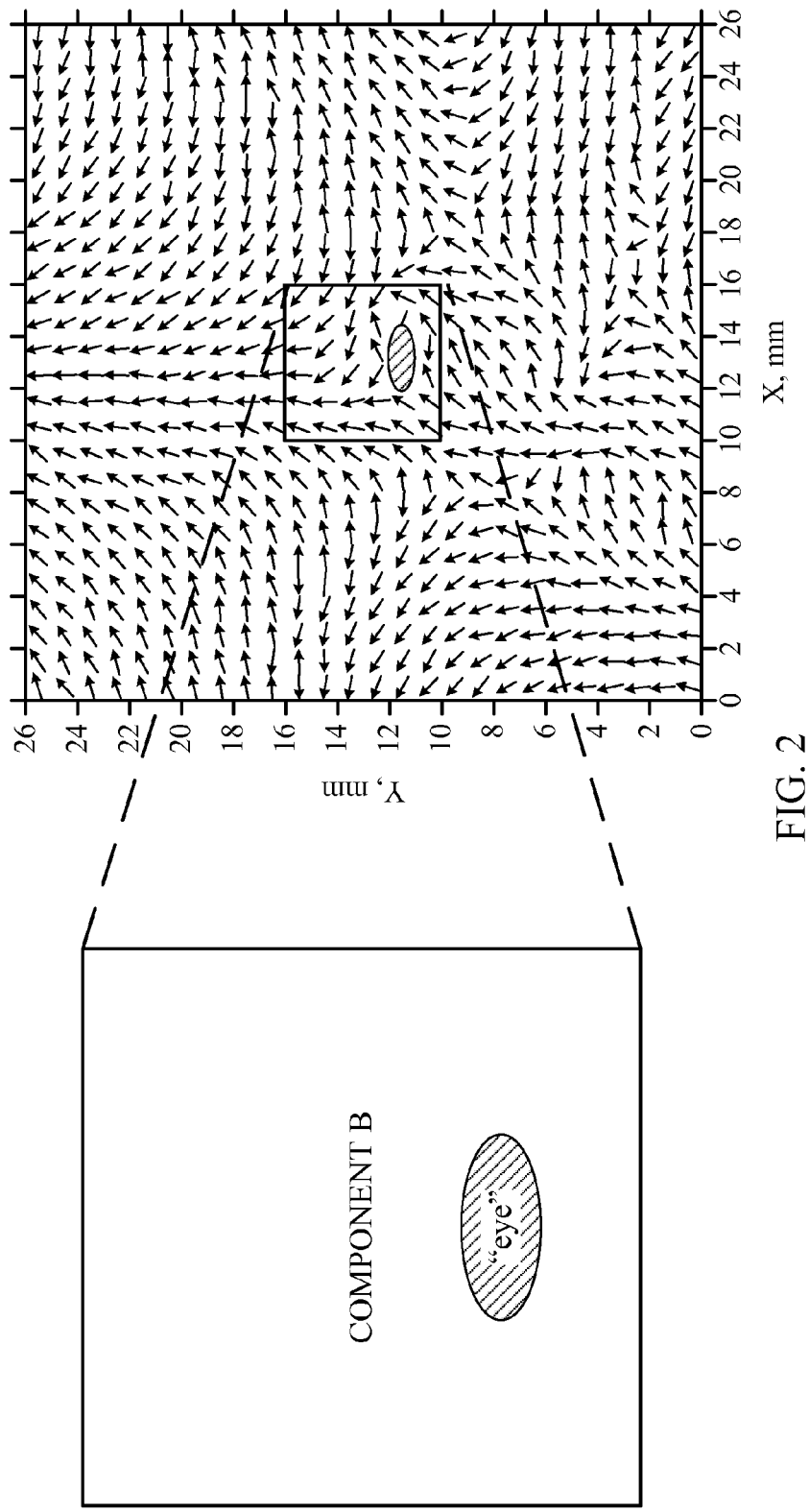
FIG. 2 illustrates the concepts of a noise vector measurement grid, and noise measurement extrapolation, associated with the example circuit in FIG. 1.

FIG. 2 illustrates the concepts of a noise vector measurement grid and noise measurement extrapolation associated with the example circuit in FIG. 1. This is similarly described in the '380 patent.

In this example, "COMPONENT B" is a device under test (DUT) whereby it is desired to measure the noise energy radiated under normal operating conditions. The left side shows the area of maximum field strength (the "eye"), for which the field is greatest, and is known from measurements. By consideration of the "eye" the fields outside the boundary of component B can be extrapolated—as shown on the right—beyond the boundary of the component. The dashed lines linking the left and rights sides show the correspondence of the components in the figure.

In wireless handset design, often the physical size of circuit 100 is small relative to the wavelength of radiated energy from an aggressor block. Altogether, the layout, component orientation, strength of interfering fields and associated wavelengths may greatly impact the extent to which an aggressor block may impact a victim block. Knowledge of emissions profiles and susceptibility profiles of both aggressor and victim blocks and of interference mechanisms allow designers to optimize floor planning and layout to minimize both intra-component and inter-component interference.

In addition to emissions profiles therefore, embodiments disclosed herein calculate and/or measure so-called susceptibility profiles for individual victim blocks. This is also described in detail in the '380 patent. Each victim block has a quantifiable susceptibility to electromagnetic noise, whereby the same amount of external incident noise affects different components differently. In essence, by knowing the emissions profile of an aggressor block and the susceptibility profile of a victim block, an estimate of the expected induced interference from aggressor to victim can be generated using computational or experimental techniques. For instance, differences in packaging and shielding may exist among the various components, whereby better packaged components are less likely to experience operational degradation due to a given external noise level. Thus, during the planning stage, it may be desirable to place a component that is relatively less susceptible to noise in noisier locations, since that component's operation doesn't excessively degrade. In this manner, more susceptible components can be placed in 'quieter' locations (or quieter orientations) whereby adverse effects are minimized. The undesired or unintentional radiated (in-band) emissions within a device may thus be "managed" to do the least amount of damage to overall device/system performance.

As will be described further below, it may be advantageous to model or monitor individual victim component performance as an ultimate measure of susceptibility, in an environment of varying noise. One example metric of such performance is the output S/N ratio of a receiver component, for known input signal conditions, as a function of varying (in intensity and frequency) internally generated noise from aggressors. In this manner, circuit layout and adaptive operational adjustment at the device level may be optimized.

The emissions profiles and susceptibility profiles can be calculated and/or measured by known techniques, such as those described in the '380 patent, granted to the inventor herein, assigned to the assignee herein and incorporated herein by reference in its entirety. The '380 patent discloses methods, systems and apparatuses for automated electromagnetic compatibility driven (EMC-driven) layout and floor planning of electronic devices and systems, which account for electromagnetic interactions between circuit components and address EMC issues at the outset of the design phase. Problems that may affect system performance are predicted, and a new layout optimized for reduced EMI may be suggested, before an expensive prototyping operation is performed. In this manner, the causes of such problems are identified with better certainty than is possible with a defective prototype, resulting in a reduced design cycle and reduced time to market.

Thus, as taught in the '380 patent, it is desirable to optimize the circuit layout for reduced emissions and EMI at the design stage. Aspects of the present invention may achieve further reduction in EMI within the electronic device by optimizing operational parameters of the device (described in greater detail below), using computational and/or experimental techniques.

In an alternate scenario, the electromagnetic profiles are used to tailor reduced functionality modes of the device, whereby EMI is reduced to improve communication quality, e.g., under poor base station signal conditions.

Figure 3:
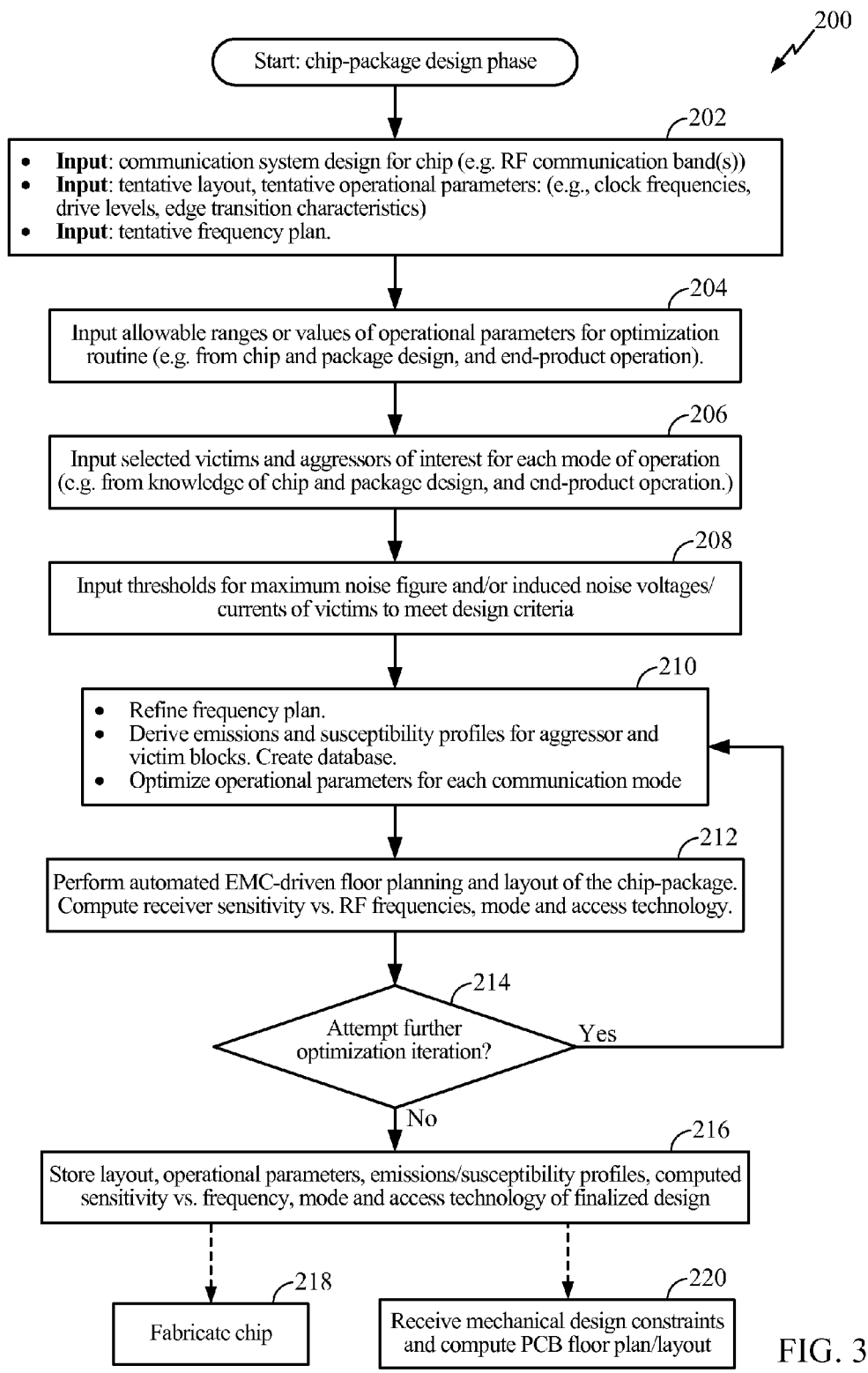
FIG. 3 illustrates an exemplary embodiment of a flow process for implementing IC chip level circuit layout and operational state optimization in accordance with the disclosure.

FIG. 3 illustrates an exemplary embodiment of a flow process, 200, for implementing ASIC chip level circuit layout and operational state optimization in accordance with the disclosure. The aim of the optimization is to achieve low internal EMI for an IC communications chip which forms part of a wireless electronic device. Process 200 is preferably a computer aided design (CAD) that is advantageously carried out in an ASIC chip-package co-design phase, i.e., prior to fabricating a prototype of the chip. In this manner, potential operational problems due to EMI are identified early, thereby avoiding the expense and time lost in otherwise fabricating, measuring and experimenting with iterations of prototypes to resolve EMI problems at chip or system level.

Process 200 is run, at least in part, on a CAD tool that complements available integrated circuit design tools such as SPICE or Apache RedHawk (the latter is commercially available from Apache Design Systems). The CAD tool helps a user to design an IC by inputting a host of circuit parameters and selecting from among circuit elements, circuit designs and layouts pre-stored in a library. In general, such tools take a netlist that describes the circuit elements (e.g., transistors, inductors, capacitors and resistors) and their connections, and translates the description into equations to be solved. Such tools then output a prediction for circuit performance—e.g., ASIC modem sensitivity, noise figure or BER for a receiver front end section under predetermined input signal conditions; power consumption, efficiency and gain for an amplification section, etc.

Accordingly, at step 202, a computer running the CAD program receives user inputs for a communication system design for the ASIC as well as the operating frequency band (s), a tentative chip layout, and tentative operational parameters. Such operational parameters may include clock frequencies (collectively known as a frequency plan), drive levels and edge transition characteristics (e.g. rise and fall times) for various components within the device. Of particular concern are the operational parameters of any potential aggressor components. An objective of the CAD program is to optimize these operational parameters to achieve a reduction in EMI while keeping power consumption low.

The various clock frequencies used by a communication chip are collectively known as a frequency plan. The choice of clock frequencies in certain chip components may in some cases be critical to the EMI impact on other chip components operating at the RF communication frequencies. This is because harmonics generated by, and emitted from, circuits operating at clock frequencies (typically tens of MHz) can fall within the range of the RF band being used for communication. Current commercial RF communication bands range from around 400 MHz all the way to 2700 MHz (for 4G systems), depending on the type of access technology, a particular country's frequency band licensing policy, etc. If the emissions energy of a clock harmonic is expected to fall within a particular band used by the wireless device, its impact on victim components will be analyzed by the CAD tool. Similarly, the magnitude of certain drive levels (currents and voltages) and nature of the edge transition characteristics of the various components (generally a function of clock pulse characteristics) are variables that also impact EMI.

Thus, to optimize a set of conditions that will limit EMI to an acceptable level, the CAD tool prompts the user to input allowable ranges or specific alternative values for the operational parameters (step 204). Knowledge of these parameters comes from, for example, chip and package hardware and software design, and also from knowledge of the operation of the end product. At this stage of the design, it is preferable to set these input ranges or values such that operation at any allowable value thereof will not reduce functionality of the wireless device as compared to operation with the tentative operational parameters input initially. (These allowable values are distinguished from those resulting in reduced device functionality, described below.)

The user is also prompted at step 206 to input identified and selected victims and aggressors of interest for each mode of operation, i.e., different communication modes. That is, the user may identify to the CAD program which chip components are victims, and which are aggressors, known a priori, to enable the program to subsequently vary (via simulation) operational parameters of aggressors and judge the impact upon the victims. Knowledge of such behavior comes from, for example, chip and package hardware and software design, and also from knowledge of the operation of the end product.

The number of communication modes is dependent upon the functionality of the wireless device. Modern 3G capable wireless devices typically have, among others, a voice call mode, a data mode, a GPS mode, and optionally a simultaneous voice and data mode. A data mode may be differentiated by data type—e.g., Internet data communication (IP protocol), text messaging or automated email delivery may each correspond to a different data mode. Modes are also defined for each access technology, if the mobile device is configured to support more than one (e.g., CDMA2000, W-CDMA, GSM, LTE, etc). A specific circuit component may be known as a victim or aggressor for one communication mode but not another; hence the CAD program allows the user to input preselected victims and aggressors for each mode.

An example of a typical aggressor of a communication chip is a driver circuit for a display or camera of the wireless device comprising the chip. Another aggressor example is a variable clock circuit of a logic control unit (LCU) which controls the transfer of data within the device. An example of a victim block is the circuitry encompassing the receiver front end of the wireless device. This includes the chain of components functioning to filter and amplify an incoming RF communications signal in accordance with control commands from the main processor of the wireless device, and circuitry to down convert, demodulate and decode the signal to recover baseband information bits representing the transmitted communication. Of particular importance is to what degree the emissions of an aggressor component—and in particular, an aggressor that is not essential to the operation of the receiver front end—will degrade operation of the receiver front end.

Metrics that may be used to quantify the impact of the aggressor on the receiving circuitry include noise figure (the increase in signal to noise ratio between specific input and output points), and noise voltages and/or noise currents at specific circuit nodes. It is desirable to correlate these noise metrics a priori with an overall measure of receiver sensitivity. Such correlation can be derived either from computational modeling or from a database of actual measurements. In wireless communications, a receiver's sensitivity is typically defined as the input RF signal level necessary to achieve a predetermined BER or frame error rate (FER) (with an amount of external noise accompanying the signal falling within a pre-established range). Thus the lower the sensitivity value, the better the receiver performance. As a relative term, a receiver is said to have a better or superior sensitivity, superior receiver performance, by having a lower sensitivity value. Accordingly, at step 208, the CAD program receives user inputs for maximum noise figure and/or noise voltages/currents of victims to meet predetermined or desired design criteria for receiver sensitivity.

At step 210, beginning with the tentative system knowledge (operating parameters, frequency plan and layout), and with help from available system modeling, measurements and profiles, the frequency plan is refined. Subsequently, the process derives noise profiles—i.e., emissions and susceptibility profiles—for aggressor and victim blocks respectively, by means of computation, modeling and/or measurement data for elements pre-stored in a library or newly inputted by the user. A database is created for the thus derived emissions profiles as a function of communication mode, RF communication frequency and layout and operational parameters. Using the emissions profiles, induced noise voltages/currents are computed in victims for each condition. The noise voltages/currents are then correlated with design parameters such as noise figure or receiver sensitivity. The induced noise voltages/currents and correlation to the design parameters are added to the noise profile database.

An optimization routine is then run for selected (critical) operational modes of the device, which varies the operational parameters in the allowable ranges, or to the allowable values input earlier, and re-calculates the in-band emissions profiles, induced emissions voltages/currents and design parameters. The routine determines: for the initial layout, the ranges of operational parameters that result in the design parameters meeting a predetermined specification; which values result in superior performance beyond the specification; and which ranges or values result in failure to meet the design goals. These results are stored in memory, along with a tentatively optimized design for each RF frequency in the band(s) of interest. For example, operational parameters of aggressor components, such as clock frequencies, drive levels, edge transition characteristics, and sequencing of components to attain the highest receiver sensitivity, may differ for various RF frequencies and may be different for different modes and bands. As will be explained below, operational parameters may be adjusted during device operation on the basis of RF frequency, mode, or access technology to achieve the lowest EMI (best receiver sensitivity) at each frequency across the band and thereby improve overall system performance.

Once operational parameters are optimized for the initial layout at step 210, automated EMC-driven floor planning and layout of the chip-package is performed at step 212 to further optimize the design. Such automated planning may be achieved using the emissions profiles of the aggressor and susceptibility profiles of victim components already derived. Thus, for example, if despite the operational parameter optimization with tentative layout in step 210, the CAD program predicts receiver sensitivity will not meet a design specification, the program may identify the aggressor(s) that is the biggest culprit and suggest a change to its location in the layout. Similarly, if the design specification is met, but with a margin the user deems less than satisfactory, the user may make a selection for layout optimization to proceed in the same manner. Once the layout is optimized, the program computes and stores receiver sensitivity as a function of RF frequency.

Next, at step 214 it is determined whether a further optimization iteration attempt should be made. For instance, if layout modification was necessary in the immediately previous step to achieve a design goal, operational parameters may be again adjusted in step 210, and then the layout planning revisited at 212 in a refinement process. This type of iterative process may be used to ensure that the best combination of layout planning and operational planning achieves the lowest possible EMI.

Once the program determines that no further optimization is necessary, the final layout is stored (step 216) along with final values for operational parameters, emissions/susceptibility profiles, and computed sensitivity vs. carrier frequency for the finalized chip-package design. Thereafter, as indicated at 218, designers may optionally proceed with chip fabrication using the finalized layout and suitable means to implement the operational parameters. To this end, the operational parameters as a function of receive frequency for each mode and band are stored in on-chip memory or other memory of the wireless device. An algorithm running on the device processor may then adaptively control adjustment of these parameters, according to changes in frequency channel and mode, to achieve optimum EMI and sensitivity performance under all conditions. Further, frequency channel acquisition may be prioritized as a function of the receiver sensitivity results. The prioritization may be done either by the wireless device or by the base station (or both), once the wireless device provides the base station with its sensitivity data. With this technique, base stations may transmit less RF power on average to the wireless device to realize a given quality-of-service objective. Such reduction in RF power transmitted by the base station translates to a reduction in interference noise incident upon other wireless devices and/or the ability to service more devices in a given CDMA channel, as well as reduced handset power consumption.

Independent of the fabrication of the IC communication chip, it is desirable to initiate a CAD process for a low EMI printed circuit board design comprising the IC chip, as indicated at 220. With today's portable wireless devices, a single multi-functional communication chip can provide a substantial portion of the total electronics required, but typically not all of the electronics. Hence the IC chip is mounted on a PCB along with other circuit blocks comprising chips and/or discrete components. The EMI impact of each circuit block on the IC chip can be simulated with the CAD process, and an optimization routine run to reduce EMI to acceptable levels.

Figure 4:
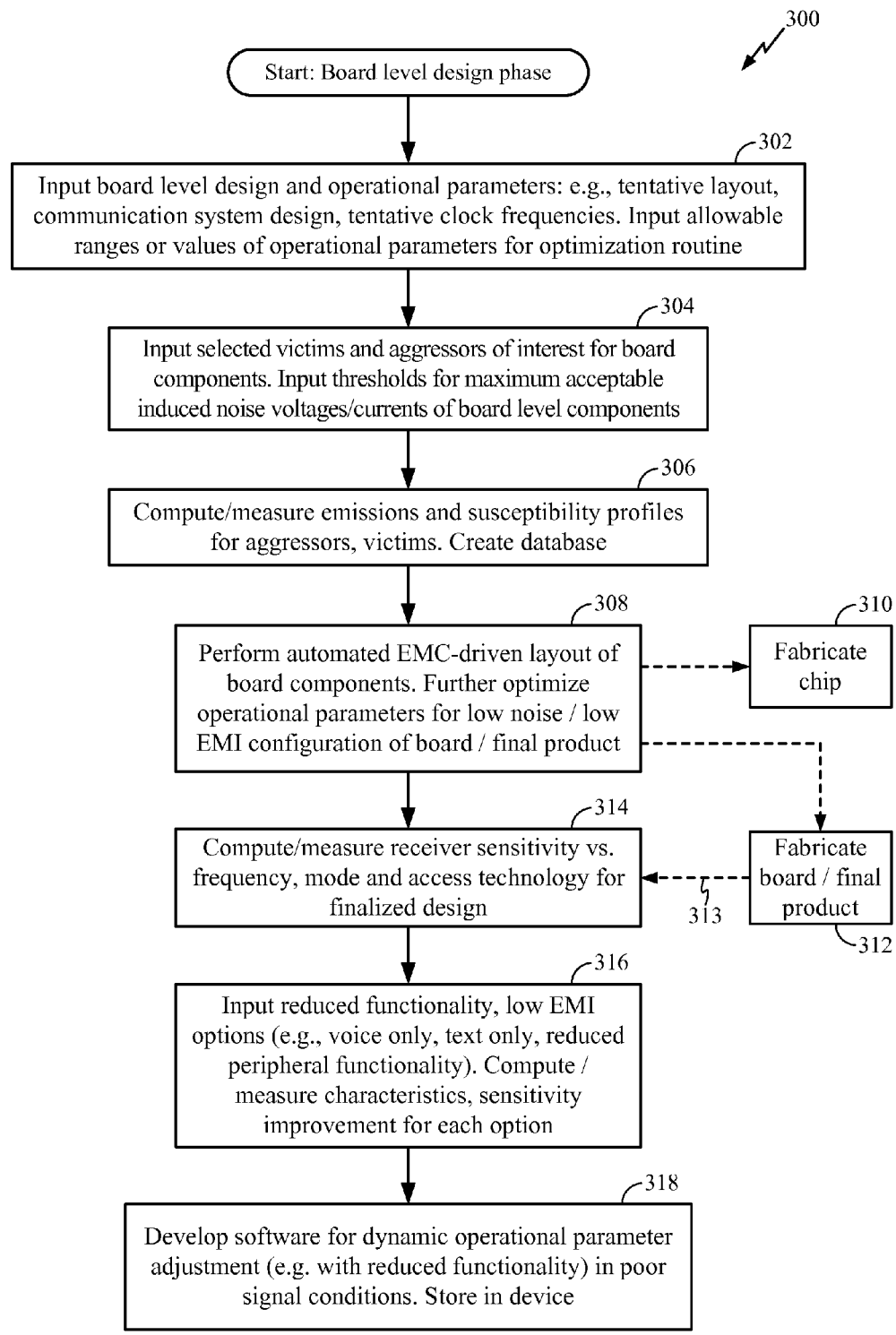
FIG. 4 illustrates an exemplary embodiment of a flow process of a computer aided design for an optimized printed circuit board comprising one or more IC communication chips.

FIG. 4 depicts an exemplary embodiment of a flow process, 300, of a computer aided design for a printed circuit board (PCB) comprising one or more IC communication chips, to achieve a low EMI configuration for the PCB. Certain aspects of flow process 300 are geared to attain a circuit layout and operational parameter optimization in a similar manner to that of flow process 200 (described above for an individual IC chip). Preferably, the PCB design already includes the EMI optimized, multi-functional IC communication chip optimized via process 200. Thus process 300 is tailored to optimize the interaction of additional PCB circuit components with one another and with the already optimized IC chip.

Hence process 300 is essentially an extension of process 200. (Hereafter in the description of FIG. 4, reference to "the IC chip" will refer to the IC chip optimized in process 200, regardless of whether it was actually fabricated at this point.)

To this end, at step 302 the user may input a communication system design with a tentative layout, tentative clock frequencies, drive levels, switching sequences, and so forth. The user also inputs allowable ranges or values of operational parameters to be used by an optimization routine. Logically, operational parameters pertaining exclusively to the IC chip have already been optimized, and these optimized values should continue to be used as a starting point. However, it is possible that emissions from other components of the PCB will impact the performance of the IC chip such that it may be desirable to revisit the IC chip's operational parameters to determine if further adjustments can be beneficial.

At step 304, the user may input selected victim and aggressor board components for each mode of operation of the board. Thresholds may also be input for maximum induced noise voltages and/or currents of board level components, if these are known a priori. At 306, emissions and susceptibility profiles of board level aggressors and victims are derived via calculation, modeling and/or empirical data extracted from a database of the CAD program or newly input by the user. The profiles are stored in their own database.

At step 308, the CAD program performs automated EMC driven layout optimization of the board components. In addition, operational parameters are further optimized, if possible or necessary, to yield a low noise/low EMI configuration of the circuit board. The layout and parameter optimization procedure may be an iterative process wherein an incremental change to the layout is made, followed by a possible incremental change to operational parameters, and so on. For instance, if the initially input tentative layout of the board resulted in a failure to meet design specifications due to a particular aggressor, the aggressor's location and orientation on the board and/or its peculiar operating parameters may be adjusted in an iterative process. If possible, the operating parameters of the IC chip—although already optimized at the chip level design phase of process 200—may be further adjusted to achieve low EMI optimization. Also, EMI considerations for the final product beyond the PCB design include the placement of the PCB with respect to other components of the device such as the battery, the antenna(s) if not built into the PCB, and the device package. The impact of these variables may be modeled by the CAD program as well, with knowledge of the electromagnetic characteristics of the battery and package, noise generated by the battery, coupling of energy from the transmit antenna into receive paths, and so forth.

Once the optimization routine is exhausted to provide an optimized PCB layout and optimized set of operational parameters, then a decision may be made to fabricate the IC chip (if not done so previously), as indicated at 310. A decision may also be made to fabricate the PCB at 312.

At step 314, final values for the receiver sensitivity vs. carrier frequency, communication mode and access technology are computed by the CAD program using operational parameters of the optimized board. Receiver sensitivity may also be measured at this stage, as indicated by path 313, if the PCB was fabricated at 312. The measured sensitivity values, if available, are stored in the device memory for later use in at least a channel acquisition procedure during device operation. Otherwise, if no measured values are available, the computed values are stored for this purpose.

The next step, 316, introduces a reduced functionality, low EMI option into the design process. This option serves to reduce EMI under certain circumstances by temporarily eliminating a function of the device or limiting a function in a dynamic manner. That is, aggressor blocks are disabled, or their functionality limited, to diminish the EMI that they generate. During device operation, should the communication signal from the base station fall below a quality threshold by becoming too weak and/or noisy, the device may be designed to automatically initiate a reduced functionality option. This option reduces internal EMI in an attempt to communicate using the low quality base station signal.

In the design process, the CAD program receives user inputs at 316 for reduced functionality options. One example is a voice-only option which disables data and GPS communication capability during a voice call, thereby eliminating any EMI incident upon the voice call electronics that would otherwise arise during a simultaneous voice and data mode. Conversely, a data-only option disables voice call functionality during the simultaneous voice+data mode. For instance, a user of the device might select a data-only option during an important download, by selecting from a settings option, a function key, or the like, corresponding to the data-only option. Another reduced functionality option is to disable or reduce functionality of a peripheral, e.g., the display or camera, which is the cause of interference to the voice or data communication electronics. A display's functionality can be reduced by reducing its drive power and thereby dimming the display, or adjusting the clock frequency controlling the rate by which data is transferred to the display (thus slowing it down). Similarly, in a simultaneous call+camera mode, as when a user takes a video clip during a call, interference from the camera electronics can be reduced in a reduced functionality mode for the camera, if necessary.

For each reduced functionality option input by the user, the CAD program computes the change in emissions characteristics from the aggressor block(s) being disabled or undergoing reduced functionality. The impact of the reduced emissions on the victim(s) in terms of reduced noise voltages/currents is likewise derived, whereby an estimate of sensitivity improvement can be made. The calculated sensitivity improvement, or a predicted improvement in BER/FER correlated with the sensitivity improvement, is stored in device memory for each reduced functionality option. Improvement values can be stored for each relevant condition, e.g. as a function of carrier frequency, communication mode and access technology. During subsequent device operation, if a communication quality measure, e.g. BER, FER or received signal strength indicator (RSSI), fails to meet a minimum specification despite the base station signal transmitting the maximum allowable power in whatever variable power scheme is employed, the device can consider entering a reduced functionality mode. To this end, a look-up table in device memory for sensitivity or BER/FER improvement for the various reduced functionality options can be consulted. If, based on the look-up table data, the BER/FER or RSSI is expected to rise above the specification limit, then the device can implement one of the reduced functionality options to improve communication quality to an acceptable level, and continue the communication session with the poor base station signal.

Accordingly, at step 318, a look-up table containing the sensitivity improvement data (which may be correlated to RSSI), and/or BER/FER improvement data for each reduced functionality option is stored in the electronic device memory. A software routine controlling the selection of reduced functionality modes is also stored within device memory to be subsequently executed by a device processor, e.g., in a main processor/controller of the IC chip controlling most of the device operations.

The software routine may utilize a ranking system for reduced functionality options which considers both the amount of sensitivity improvement expected and the likely effect of the reduced functionality on the device's user. Generally, the routine compares the improvement in sensitivity predicted for the various options with the magnitude of the drop-off of the base station signal below a minimum threshold, as determined by an RSSI or S/N measurement by the device. For instance, the routine may direct that the display be temporarily shut off only as a last resort, since this action is more likely to result in a negative user experience. Instead, the routine may be designed to dim the display, or go black and white, yielding less sensitivity improvement, but possibly enough to offset the quality reduction due to the weak or noisy base station signal. If the RSSI measurement indicates that the base station signal has dropped beyond a point where improvement in sensitivity due to reduced functionality would raise quality to an acceptable level, the software routine may refrain from entering a reduced functionality mode. Instead, the device processor may take other measures such as searching for a new channel or entering an idle mode until it detects another suitable base station signal.

Figure 5:
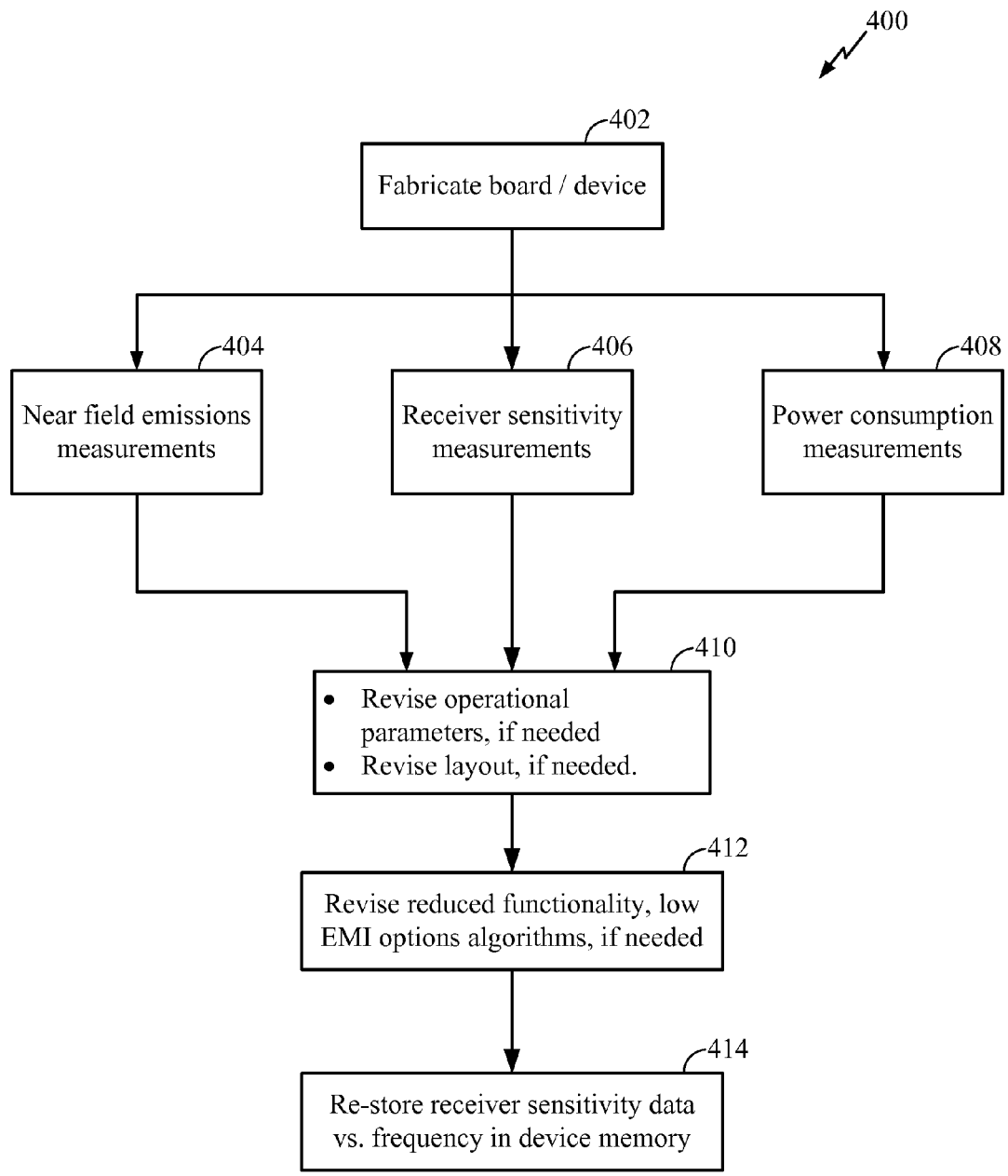
FIG. 5 depicts an exemplary embodiment of a process for fine tuning operational parameters of an electronic device whose design has been optimized in accordance with the processes of FIGS. 3 and 4.

FIG. 5 illustrates an embodiment of a process 400 for fine tuning operational parameters of an electronic device whose design has been optimized in accordance with the processes 200, 300 of FIGS. 3 and 4. At 402, the CAD-optimized PCB is fabricated and prepared for testing. Optionally, the wireless electronic device containing the PCB is fabricated as well, such that the EMI effects of the environment within which the PCB operates is accounted for. Thus, the impact of any electromagnetic interaction involving design package, antenna, power supply generated noise, and so on, can be verified through measurements, and in parallel generate power consumption metrics.

Next, the device undergoes, for each defined mode of operation measured, a series of receiver sensitivity measurements as indicated at 406, as well as power consumption measurements at 408, which may be performed concurrently. Receiver sensitivity is measured over the frequency band(s) of operation, different modes of operation, and for different access technologies, if applicable, to confirm that it passes a minimum specification. Power consumption is also measured with respect to a maximum specification. The measured receiver sensitivity is compared to the values that were predicted by the CAD program during the optimization process 300 for all the relevant conditions.

If the measured sensitivity is worse than the predicted value under any condition by more than a predetermined margin, or if the sensitivity does not pass the minimum specification, then it becomes desirable to perform near field emissions measurements as indicated at 404, to investigate the cause of the discrepancy. For instance, the emissions from a particular component of the PCB may higher than expected, or beyond a specification limit for that component. The emissions may be supplier dependent, whereby it becomes necessary to replace a component having excessive emissions with one from another supplier. Another cause of the discrepancy may simply be a less than perfect modeling of the circuit characteristics performed at the CAD stage.

It may also be possible to resolve a minor sensitivity problem of the fabricated device by revising operational parameters and/or layout, as indicated at step 410. Minor adjustments to parameters such as clock frequencies, drive levels or switching sequences may be sufficient to improve sensitivity beyond a specification threshold, or up to a desired margin above the threshold.

At step 412, the algorithms for the reduced functionality, low EMI options are revised, if necessary, to account for the difference in measured sensitivity values of the device to the predicted values obtained from the CAD process. Further, additional receiver sensitivity measurements may be taken in this step, i.e., comparing receiver sensitivity with and without the reduced functionality option. The improvement in receiver sensitivity for each option is compared to that which was predicted in the CAD process (step 316 of FIG. 4). Significant discrepancies are investigated to improve subsequent CAD processes. The measured improvement values are then used in the reduced functionality algorithms stored in the device memory in place of the predicted values.

At step 414, the final measured receiver sensitivity data (as well as any change in the operational parameters at step 410) as a function of carrier frequency and other conditions are re-stored in device memory for use in subsequent device operation. Such operation may include sending sensitivity and power consumption metrics (for various carrier frequencies, modes, access technologies, etc.) to the base station for network optimization.

Figure 6:
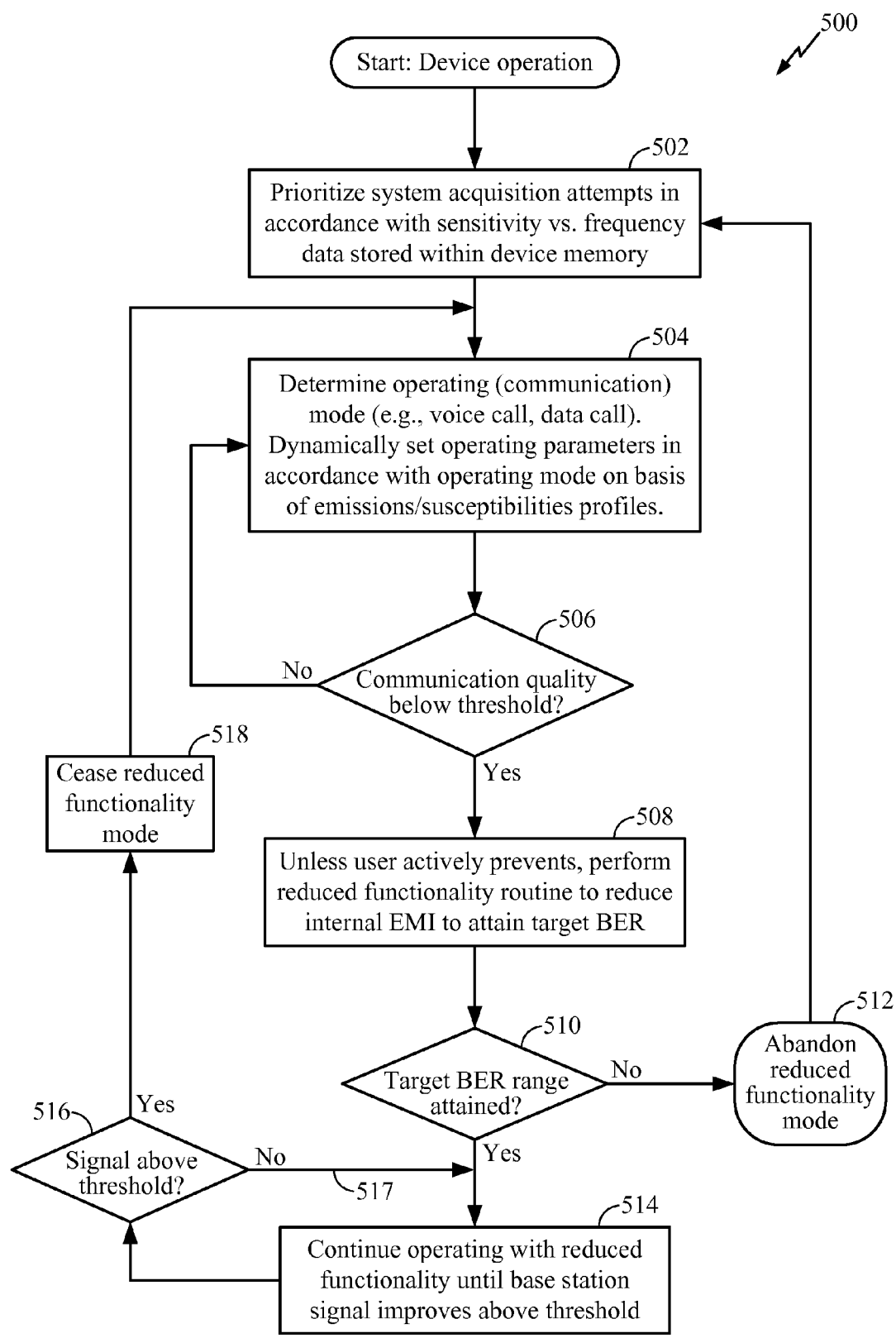
FIG. 6 illustrates an exemplary embodiment of a flow process by which a wireless device performs dynamic operational parameter adjustment to achieve low EMI operation.

FIG. 6 illustrates an exemplary embodiment of a flow process 500 by which a wireless device performs adaptive operational parameter adjustment to achieve low EMI operation. When the device initiates a voice or data call, instead of randomly searching for a frequency channel or tuning to a channel directed by a base station command, as in the conventional standby mode approach, it initiates a priority based acquisition attempt. That is, at step 502, a system acquisition attempt is made in a prioritized fashion in accordance with the receiver sensitivity ranking vs. frequency data stored in the device memory. The prioritized attempt may be controlled either by the device or by the base station. In the former case, the device consults the ranking data for the highest ranked channel (having the best sensitivity) and determines from base station control channel data whether that channel is available with suitable signal strength. If so, system acquisition is attempted on that channel. Otherwise, the device repeats the process for the next highest ranked frequency channel, and so forth, until a channel is acquired.

In the second option, i.e., in which the prioritized attempt is controlled by the base station, the device first provides the base station with its receiver sensitivity data. This transfer of data may be done wirelessly from the device to the base station in a reverse control channel. In the alternative, the base station may retrieve the particular device's sensitivity data through the network via a database that obtained the information when the device was first registered for use. In either case, the base station instructs the device to attempt channel acquisition on an available frequency channel that the base station determines is the best match for the device on the basis of its sensitivity characteristics.

Regardless of whether the device or the base station controls the prioritization technique, its implementation results in the base station transmitting less RF power on average to the wireless device to realize a given quality of service objective. This reduction in RF power transmitted by the base station translates to a reduction in interference noise incident upon other wireless devices and/or the ability to service more devices in a given channel. The base station and wireless device may still follow a power control scheme whereby base station power is reduced to a level necessary to maintain the BER or FER of the device within a target range. Using the frequency at which the best sensitivity of the device is achievable, a further reduction in base station power is possible. A reduction in base station power transmitted noise results in reduced handset power consumption.

With the channel thus acquired, the process continues to step 504 where the device continually analyzes its operating communication mode and adaptively optimizes its operating parameters in accordance with the operating mode and frequency, as determined from device memory. These parameters were initially derived as a function of emissions and susceptibility profiles from the processes 200, 300 of the design stage, and were optionally fine tuned during process 400. During a voice call, for example, the user may suddenly enter into a simultaneous voice+data mode in which the user surfs the Internet, or initiates an Internet download while carrying on a conversation. The device then detects a change in communication mode and consults the database to determine if operating parameters corresponding to the voice+data mode differ from the prior (voice only) mode. If so, the device proceeds to change the operating parameters accordingly.

During a communication mode, the device continually monitors, at step 506, whether communication quality has fallen below a threshold, or if the call is lost. As mentioned above, in the power control schemes of today's cellular systems, base station power is reduced to a level necessary for the BER (or FER) of data received by the device to stay within a pre-established range. If the BER rises above the range, the base station increases its transmit power in that channel to improve the signal quality. At step 506, if, despite the base station's effort to increase its power to a maximum level allowable, the BER is still outside the range, then the device may initiate a reduced functionality routine at step 508. This initiative is taken as an alternative to a conventional approach of beginning a search for a new channel. In a reduced functionality option, as described above in connection with FIG. 4, a software routine selects functionality to be reduced on the basis of an expected sensitivity improvement, by reducing EMI from an aggressor to a victim. For instance, the device display, a typical aggressor with respect to the receiver front end circuitry, may be dimmed by reducing its drive levels, producing an improvement in receiver sensitivity. To achieve a maximum improvement in sensitivity during a voice call, for example, all circuitry that is not essential to the voice call is disabled. In any case, the software routine makes the reduced functionality selection based upon predetermined criteria, unless the user has disabled this option via a settings selection, a function key or the like (assuming the device is so configured).

If, at step 510 despite the reduced functionality, the measured BER is still above the target range or moves above the range, the routine abandons the reduced functionality mode at step 512. In this case, the device returns to full functionality and re-attempts system acquisition on another channel at 502.

If the base station signal strength improves above the minimum threshold at step 516, the reduced functionality mode is stopped at step 518 and normal operation is continued at 504. Otherwise, reduced functionality continues as indicated by path 517.

Figure 7:
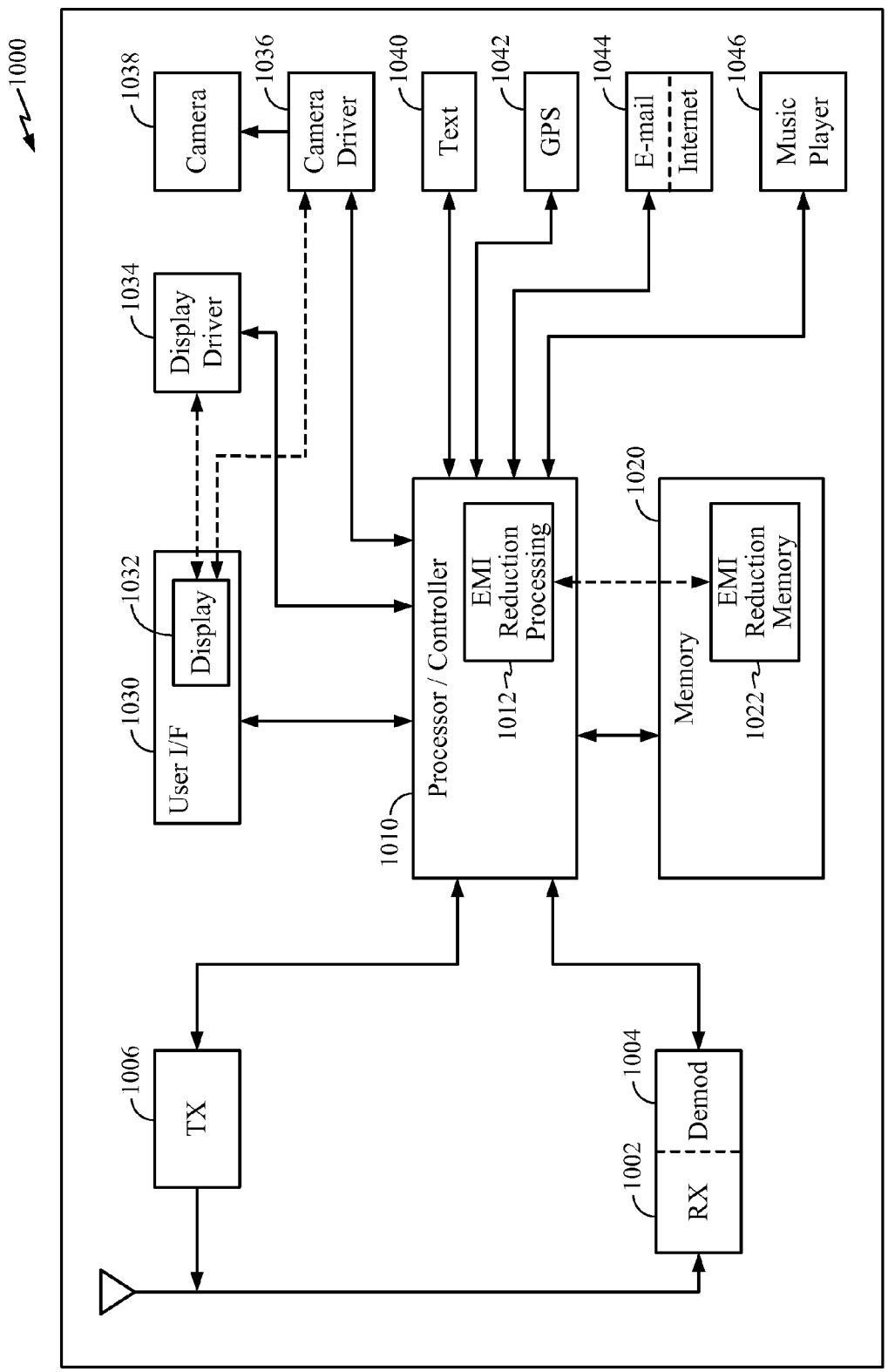
FIG. 7 is a functional block diagram of an embodiment of a wireless device capable of enhanced operation, by means of component operational state control in accordance with the disclosure, in a weak and/or noisy signal environment.

FIG. 7 is a functional block diagram of an embodiment of a wireless device, 1000, which is capable of enhanced operation in a weak and/or noisy signal environment, by means of component operational state control.

Device 1000 includes a processor/controller 1010 that performs the processing and controls operations generally of device 1000, by interacting with a user interface 1030 with display 1032, receive and demodulation blocks 1002, 1004, a transmit section 1006, a memory 1020, and the other shown components 1034 through 1046 in a known manner. An EMI reduction processor 1012, shown as part of processor/controller 1010, executes EMI reduction processing instructions stored in an EMI reduction memory 1022, where the latter may be part of memory 1020. In alternative embodiments, EMI reduction processor 1012 and the program instructions may be implemented as a software/firmware module running on a processor separate from processor 1010. In either case, EMI reduction processor 1012, in conjunction with processor/controller 1010 implements the relevant processing for the EMI reduction techniques described hereinabove, e.g., in the flow diagram of FIG. 6. EMI reduction memory 1022 stores the aggressor component rankings data, incident and induced noise data, and secondary input signal quality threshold data for use by processor 1012 to implement adaptive changes as described.

Any of the exemplary peripherals 1034-1046 may act as aggressor blocks and have operational states dynamically controlled by processor 1012 in accordance with the reduced functionality option processes described hereinabove. These include a display driver 1034 driving display 1032; a camera driver 1036 driving camera 1038; a texting module 1040; a GPS module 1042; an email/internet module 1044; and a music player 1046.

Those of skill would further appreciate that the various illustrative logical blocks, modules, circuits, and algorithm steps described in connection with the embodiments disclosed herein may be implemented as electronic hardware, firmware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of adaptively changing an in-band noise metric of a wireless device, comprising:
   determining a current operating mode for the device;
   detecting that a first communication quality indicator for the current operating mode has fallen below a first threshold;
   selecting a reduced functionality option from a database stored at the device based on the current operating mode in response to the first communication quality indicator falling below the first threshold;
   selecting a sensitivity improvement value associated with the reduced functionality option, the sensitivity improvement value identifying aggressor components; and
   disabling one or more of the aggressor components until a second communication quality indicator exceeds a second threshold.

2. The method of claim 1, wherein the current operating mode comprising one of a standby mode, a call establishment mode, and a call in-progress mode.

3. The method of claim 1, further comprising enabling a voice only mode until the second communication quality indicator exceeds the second threshold.

4. The method of claim 3, wherein the voice only mode is enabled automatically when the first communication quality indicator falls below the first threshold.

5. The method of claim 3, wherein the voice only mode is enabled manually by a device user.

6. The method of claim 1, further comprising disabling the one or more aggressor components based on a preprogrammed algorithm.

7. The method of claim 6, wherein the preprogrammed algorithm is configured for one or both of saving battery power and maintaining a communication link.

8. The method of claim 1, wherein the disabling involves adjusting delay time before switching on a next sequentially switched aggressor component.

9. A device comprising:
means for determining a current operating mode for the device;
means for detecting that a first communication quality indicator for the current operating mode has fallen below a first threshold;
means for selecting a reduced functionality option from a database stored at the device based on the current operating mode in response to the first communication quality indicator falling below the first threshold;
means for selecting sensitivity improvement value associated with the reduced functionality option, the sensitivity improvement value identifying aggressor components; and
means for disabling one or more of the aggressor components until a second communication quality indicator exceeds a second threshold.

10. The device of claim 9, wherein the current operating mode comprising one of a standby mode, a call establishment mode, and a call in-progress mode.

11. The device of claim 9, further comprising means for enabling a voice only mode until the second communication quality indicator exceeds the second threshold.

12. The device of claim 11, wherein the means for enabling is configured to enable the voice only mode automatically when the first communication quality indicator falls below the first threshold.

13. The device of claim 11, wherein the means for enabling is configured to enable the voice only mode in response to a user input.

14. The device of claim 9, further comprising means for disabling the one or more aggressor components based on a preprogrammed algorithm.

15. The device of claim 14, wherein the preprogrammed algorithm is configured for one or both of saving battery power and maintaining a communication link.

16. The device of claim 9, wherein the means for disabling involves adjusting delay time before switching on a next sequentially switched aggressor component.

17. A computer program product to adaptively change an in-band noise metric of a wireless device, the computer program product comprising instructions embodied on a non-transitory computer-readable medium which when executed by a processor cause the device to:
determine a current operating mode for the device;
detect that a first communication quality indicator for the current operating mode has fallen below a first threshold;
select a reduced functionality option from a database stored at the device based on the current operating mode in response to the first communication quality indicator falling below the first threshold;
select a sensitivity improvement value associated with the reduced functionality option, the sensitivity improvement value identifying aggressor components; and
disable one or more of the aggressor components until a second communication quality indicator exceeds a second threshold.

18. The computer program product of claim 17, wherein the instructions to disable the one or more of the aggressor components cause the device to perform at least one of: (i) selectively turning off at least one first aggressor component; (ii) reducing drive to at least one second aggressor component; (iii) powering up at least one third aggressor component incrementally; (iv) turning on at least two aggressor components sequentially; and (v) adjusting a delay time before switching on a next sequentially switched aggressor component.

19. A device comprising:
a memory to store near field emissions values of a noise metric; and
a processor to:
determine a current operating mode for the device;
detect that a first communication quality indicator for the current operating mode has fallen below a first threshold;
select a reduced functionality option from a database stored at the device based on the current operating mode in response to the first communication quality indicator falling below the first threshold;
select a sensitivity improvement value associated with the reduced functionality option, the sensitivity improvement value identifying aggressor components; and
disable one or more of the aggressor components until a second communication quality indicator exceeds a second threshold.

20. The device of claim 19, wherein the processor is configured to disable the one or more of the aggressor components by performing at least one of: (i) selectively turning off at least one first aggressor component; (ii) reducing drive to at least one second aggressor component; (iii) powering up at least one third aggressor component incrementally; (iv) turning on at least two aggressor components sequentially; and (v) adjusting delay time before switching on a next sequentially switched aggressor component.

* * * * *